Patented June 30, 1953

2,643,968

UNITED STATES PATENT OFFICE 2,643,968

RECOVERY OF VITAMIN B$_{12}$ WITH MONOHALOPHENOLS

Jerry Robert Daniel McCormick, Pearl River, N. Y., and Siegfried Arthur Muller, Dumont, N. J., assignors to American Cyanamid Company, New York, N. Y., a corporation of Maine No Drawing. Application February 16, 1951, Serial No. 211,444

7 Claims. (Cl. 167—81)

This invention relates to the recovery of vitamins from aqueous solutions and more particularly to the recovery of those of the vitamin B12 group.

Recently, vitamin B12 has been isolated from natural sources in which it occurs in extremely minute amounts. The chemical structure of the substance has not been finally determined but it has been characterized as a cyano-cobalt coordination complex. It has also been found that other closely related substances occur which have vitamin-like properties but different chemical constitution. For example, vitamin B12b is reported to be similar to vitamin B12 but has a hydroxyl radical instead of a cyano group in coordination with the cobalt ion. Still other modifications of the vitamin B12 molecule have been obtained and these possess biological activity and support the growth of bacteria. Conjugates of these vitamin substances with naturally occuring materials such as proteins may also occur and these two possess vitamin-like activity. The importance of these substances in nutrition and in the treatment of anemia has been established and it is now considered necessary that a source of supply of substantial quantities be made available.

Vitamin B12 is a constituent of liver and other natural substances and extracts thereof have been used in medicine for the treatment of anemias. More recently it has been found that compounds of the vitamin B12 family are produced by fermentation processes by various micro-organism including bacteria and fungi such as *Streptomyces aureofaciens, S. griseus, S. fradiae, Flavobacterium solare, Clostridium butyricum, Aerobacter aerogenes, Ashyba gossypii,* etc. Unfortunately, however, these organisms produce the vitamin B12 substances in such small amounts that the aqueous fermentation liquor contains only a fraction of one microgram of the pure vitamin per milliliter of solution. The problem of concentrating and isolating the vitamins in a form suitable for therapeutic use is obviously highly complex and beset with many difficulties. Among the principal objects of the present invention therefore is to provide an improved process by which these vitamin B12 substances may be obtained from aqueous solutions containing them.

Since the various substances having vitamin B12-like activity are believed to have a general similarity of structure and chemical and physical properties and can be obtained from aqueous solutions by the process about to be described, reference herein to the term vitamin B12 is meant to include the various substances mentioned above that are closely related which have been found to be physiologically active in the treatment of pernicious anemia and as growth promoting factors. The name cobalamin has been proposed as indicating the general nucleus with which the physiological activity appears to be associated and the various substances referred to herein may also be generally designated as cobalamins.

Although phenol and certain alkylated phenols have been used to extract an anti-pernicious anemia substance from aqueous liver extracts by a liquid-liquid extraction system (Note U. S. Patent 2,134,256) we have discovered that halophenols may be used to considerable advantage in that they have a lower solubility in water and an excellent distribution coefficient toward vitamin B12 in the halophenol-water system. Further, the vitamin B12 can in turn be recovered from the halophenols with ease. The halophenols also have a higher specific density than previously used phenols and separate more readily from the aqueous phase after extraction.

As a result of these advantages the process of the present invention can be carried out with higher yields and lower cost in a shorter time than previously known processes. It accomplishes a large volume reduction in the solutions in a minimum of steps. The new process is also characterized by its ease of mechanical operation making expensive equipment unnecessary. Other advantages will be apparent to those in the art.

According to the process of the present invention an aqueous solution containing vitamin B12 substances is extracted in a liquid-liquid phase system with a halophenol. At present, parachlorophenol is the preferred halophenol in the process, but other halogenated phenols may be used. In general, any halogenated phenol having a melting point below 100° C. in the presence of water may be used in the process of the present invention. Among these may be mentioned ortho-chlorophenol, chlorometacresol, parabromophenol, 4-chloro-2-phenyl-phenol, 2-chloro-3-hydroxytoluene, 2-chloro-6-hydroxytoluene, 1-nitro-4-chlorophenol and the like.

The aqueous solution from which the vitamin B12 substance may be extracted include raw fermentation liquors produced by the action of bacteria, yeasts or fungi of the kind previously mentioned. The antibiotic and other substances formed by the fermentation process, if any, may be removed, if desired, before applying the process to be described and claimed. Aqueous extracts of liver and other natural products containing vitamin B12 may be treated by the process of the present invention. The solutions may be filtered or unfiltered. They may have been given previous chemical or physical treatments for various purposes such as to increase the amount of vitamin B12 therein or its availability. Such prior treatments include breaking up a conjugate by hydrolysis, breakdown of cellular tissue to liberate the contained vitamin and chemical treatment whereby the vitamin B12 substance is converted into a more desirable form. Relatively concentrated aqueous solutions of the vitamin B12 are also suitable for use in the process. Generally speaking, the aqueous solution may contain anywhere from 0.05 microgram of vitamin B12 activity to as much as 50 micrograms of the activity per milliliter or even more.

An important advantage of the present process is that pH control is not necessary. The pH of the solution is limited only by the stability of the vitamin substances and may range from a pH as low as 0.5 up to about 10.5. Under some conditions the addition of salts to the aqueous phase may give a small improvement in the yield. Any of the several salting out agents may be used for this purpose, if desired.

The temperature at which the extraction procedue takes place is not critical but it is desirable that the halophenol be in liquid phase with the aqueous solution. Room temperatures are generally employed, but the temperatures may be as low as 10° C. in the case of parachlorophenol or as high as 100° C. When using other halogenated phenols the maximum and minimum temperatures may vary from these.

The extraction process whereby the vitamin B12 activity is extracted from an aqueous solution into the halogenated phenol may employ any of the common liquid-liquid extraction systems wherein one of the phases is immiscible with the other. All that is necessary is that the two liquid phases be brought into interfacial contact, the surfaces being as large as possible to secure maximum extraction in a minimum of time. Merely agitating the two liquids together in a tank will suffice under some conditions. The use of a packed extraction tower, preferably counter current, is an excellent means of carrying out the process. Special equipment such as the Schiebel column, the Podbielniak extractor, horizontal extractors and still other devices whereby the two liquids may be brought into contact with each other and the two immiscible phases then separated may be used.

The time of the extraction process is obviously dependent upon various factors including the particular extraction method or equipment used and the volume of the solutions involved. Generally speaking, a shorter extraction period is used at higher temperatures principally because of the fact that vitamin B12 is not completely stable at higher temperatures in phenols.

The volume of the halogenated phenol in relationship to the volume of the aqueous solution may vary widely and is dependent upon several factors which may be easily controlled by those skilled in the art. When using parachlorophenol, the phenol phase generally need not be more than about 10% of the aqueous phase. On the other hand it may be as low as 1% of the aqueous phase (in excess of that necessary to saturate the aqueous solution) for example, in a counter current five step extraction. Specific characteristics of particular extraction devices often dictate the relative volumes of the two phases and prevent a lower ratio of the halophenol to the aqueous phase. Also, some halophenols have a different distribution coefficient than others. Vitamin B12 has a distribution coefficient at room temperature of approximately 60 to 1 in the system parachlorophenol-water. Other halogenated phenols have a better solubility for vitamin B12 and others have less. Generally speaking, the concentration of vitamin B12 in the phenol with respect to its concentration in water may vary from about 2 to 1 to 200 to 1.

After bringing the halogenated phenol in contact with the aqueous solution containing vitamin B12, it is separated from the aqueous phase by any convenient method and the vitamin B12 is recovered from the phenol. As a result of the processing the concentration of vitamin B12 is increased and many of the impurities previously associated with it in the aqueous solution are eliminated. Vitamin B12 may be recovered from halophenols by classical methods. For example, by diluting the phenol with a liquid soluble in phenol but which has a non-solvent action for vitamin B12. Among these may be mentioned benzene, chloroform, ethyl acetate, acetone, carbontetrachloride, petroleum ether, diethyl ether, dioxane, butanol and various other common organic solvents. U. S. Patent 2,134,256 describes such procedures. In the process of the present invention the halogenated phenol carrying the vitamin B12, is first diluted with an inert solvent to depress the solubility of the B12 therein and the resulting solution is extracted with water. The aqueous solution removes the vitamin B12 from the immiscible phenolic solution with excellent yield. The aqueous solution thus recovered may be used in its recovered form for many purposes such as mixing with animal feeds to increase the vitamin B12 content thereof. If desired these aqueous solutions may be concentrated or dried by spray drying or by freezing and drying under vacuum, or the like, to obtain products which may be employed in human therapy as in the form of vitamin capsules for oral use. If desired, the aqueous solution may be further purified and concentrated to a form suitable for parenteral use.

The process of the present invention will now be illustrated in greater particularity by means of the following examples in which aqueous solutions containing varying amounts of vitamin B12 are extracted with halogenated phenols to obtain a concentration of the vitamin B12 and purification thereof.

*Example 1*

A 1 liter portion of an *S. aureofaciens* fermentation liquor from which the aureomycin had been removed by extraction with butanol and containing about 15% by weight of sodium chloride and 0.33 gamma per milliliter of vitamin B12 was adjusted to pH of 8.1 and filtered from the small amount of flocculent precipitate that was formed. The filtrate was stirred for 10 minutes with 55 ml. of p-chlorophenol, the phenol centrifuged off and the extraction repeated. The combined extracts were assayed and found to contain 2.34 gammas of vitamin B12 per ml. and had on a dry basis a potency of 560 gammas of vitamin B12 per gram of solids. The original process liquor had a dry basis potency of only two gammas of vitamin B12 per gram of solids.

Example 2

A 1 liter portion of an aureomycin waste liquor assaying 0.35 gamma of vitamin B12 per ml. was adjusted to pH 3 and then extracted with two 50 ml. portions of p-chlorophenol by bringing the two liquid phases into interfacial contact. The two liquid phases were separated by centrifuging. The combined extracts amounted to 95 ml. and had a microbiological assay of 3.7 gammas of vitamin B12 per ml. The starting liquor had an assay of 22 gammas of vitamin B12 per gram of total solids whereas the extract contained 202 gammas of vitamin B12 per gram of solids.

Example 3

A 500 ml. portion of an aqueous concentrate having a pH of 6 and containing 2.2 gammas of vitamin B12 per ml. by assay with *Lactobacillus leichmanii* was stirred vigorously for several minutes with 25 ml. of p-chlorophenol. The p-chlorphenol, solid at room temperature, is conveniently converted to a liquid by melting it and adding about 5% by volume of water, whereupon it remains a liquid upon cooling to room temperature. The phenolic extract was separated by contrifuging and a second extraction with 25 ml. of the phenol was carried out. A total of 45 ml. of extract was thus obtained, which had an assay of 21.7 gammas per ml. of vitamin B12.

Example 4

One ml. of a pink solution of vitamin B12 assaying 41.3 gammas per ml. was warmed and shaken with 0.2 ml. of molten 2-chloro-5-hydroxytoluene. The organic solvent phase became red in color and the aqueous phase became colorless, indicating that substantially all of the vitamin B12 had been extracted therefrom. The spent aqueous phase was removed and the organic solvent was shaken with 1 ml. of distilled water and 2 ml. of chloroform, whereupon a colorless organic solvent phase was obtained and an aqueous phase, having a pink coloration, comparable to that of the original solution.

Example 5

The process described in Example 4 was repeated with the exception that the phenol was p-bromophenol instead of 2-chloro-5-hydroxytoluene. Similar results were obtained.

Example 6

The process of Example 4 was repeated, with the exception that 4-chloro-2-phenylphenol was used instead of 2-chloro-5-hydroxytoluene. Substantially all of the vitamin B12 contained in the original solution was obtained in the aqueous phase when the phenol was extracted with water and chloroform. Because of the fact that 4-chloro-2-phenylphenol is a liquid at room temperature, no warming of the solution was necessary.

Example 7

A quantity of aureomycin fermentation liquor containing 0.4 gamma of vitamin B12 per ml. was adjusted to pH 8.5 and filtered. 8 liters of this filtrate were extracted twice with two 400 ml. portions of liquefied p-chlorophenol. The combined extracts assayed 2.3 gammas of B12 per ml.

The vitamin B12 extracted from the crude aqueous solutions by the phenol in the above examples may be recovered therefrom as described in Example 4 or more generally, by the procedures described above in the specification, or by the particular methods of U. S. Patent 2,134,256. More conveniently, the vitamin B12 may be recovered from the halo-phenol by the procedure described and claimed in our copending application, Serial No. 211,443, filed of even date herewith. The aqueous extracts thus obtained may be dried and incorporated in pharmaceutical preparations intended for oral administration, or may be added to animal feeds as a growth-promoting factor. Further purifification and concentration of the aqueous solutions may be conducted by procedures known to those skilled in the art to obtain highly purified, or even crystalline, materials.

What we claim is:

1. The method which comprises the step of bringing into interfacial contact an aqueous solution containing vitamin B12 and a water insoluble mono-halophenol having a melting point below 100° C., separating the phenolic phase containing the vitamin from the aqueous phase and thereafter recovering vitamin B12 from the said mono-halophenol phase.

2. The method which comprises the step of bringing into interfacial contact an aqueous solution containing vitamin B12 and parachlorophenol, separating the phenolic phase from the aqueous phase, adding to said phenolic phase a substantially water insoluble organic liquid soluble in said phenol which depresses the solubility of vitamin B12 in said phenol, and thereafter recovering vitamin B12 from said mixed solvents by extraction with water.

3. The method which comprises the step of bringing into interfacial contact an aqueous solution containing vitamin B12 and 2-chloro-5-hydroxytoluene, separating the phenolic phase from the aqueous phase, adding to said phenolic phase a substantially water insoluble organic liquid soluble in said phenol which depresses the solubility of vitamin B12 in said phenol, and thereafter recovering vitamin B12 from said mixed solvents by extraction with water.

4. A method which comprises the steps of mixing together an aqueous solution containing 0.05 to 50 micrograms of vitamin B12 per ml. and parachlorophenol, separating the two phases and recovering from the phenolic phase vitamin B12 by adding thereto a substantially water insoluble organic liquid soluble in said phenol which depresses the solubility of the vitamin B12 therein and extracting the vitamin B12 from said mixed solvents with water.

5. A process in accordance with claim 4 in which the pH is between 0.5 and 10.5.

6. A method which comprises the steps of mixing together an aqueous solution containing vitamin B12 and from 1% to 10% by volume of a water insoluble mono-halophenol, separating the phenolic phase, adding thereto a water insoluble organic liquid soluble in said phenol which has the property of depressing the solubility of vitamin B12 therein and thereafter extracting the mixture with water.

7. A method which comprises the steps of mixing together an aqueous solution containing vitamin B12 and from 1% to 10% by volume of p-chlorophenol, separating the phenolic phase, adding thereto a water insoluble organic liquid soluble in said phenol which has the property of depressing the solubility of vitamin B12 therein and thereafter extracting the mixture with water.

JERRY ROBERT DANIEL McCORMICK.
SIEGFRIED ARTHUR MULLER.

References Cited in the file of this patent

UNITED STATES PATENTS

| Number | Name | Date |
| --- | --- | --- |
| 2,134,256 | Laland | Oct. 25, 1938 |
| 2,530,416 | Wolf | Nov. 21, 1950 |
| 2,563,794 | Rickes | Aug. 7, 1951 |

FOREIGN PATENTS

| Number | Country | Date |
| --- | --- | --- |
| 469,430 | Great Britain | July 26, 1939 |

OTHER REFERENCES

Rickes, Science, Volume 107, April 16, 1948, pages 396, 397.

Rickes, Science, Volume 108, December 3, 1948, pages 634, 635.

Kaczka, Science, Volume 112, September 29, 1950, pages 354, 355.